Dec. 1, 1931.  G. E. JANSSON  1,834,212
CONDENSER TYPE BUSHING FOR HIGH TENSION ELECTRIC CONDUCTORS
Filed May 12, 1927
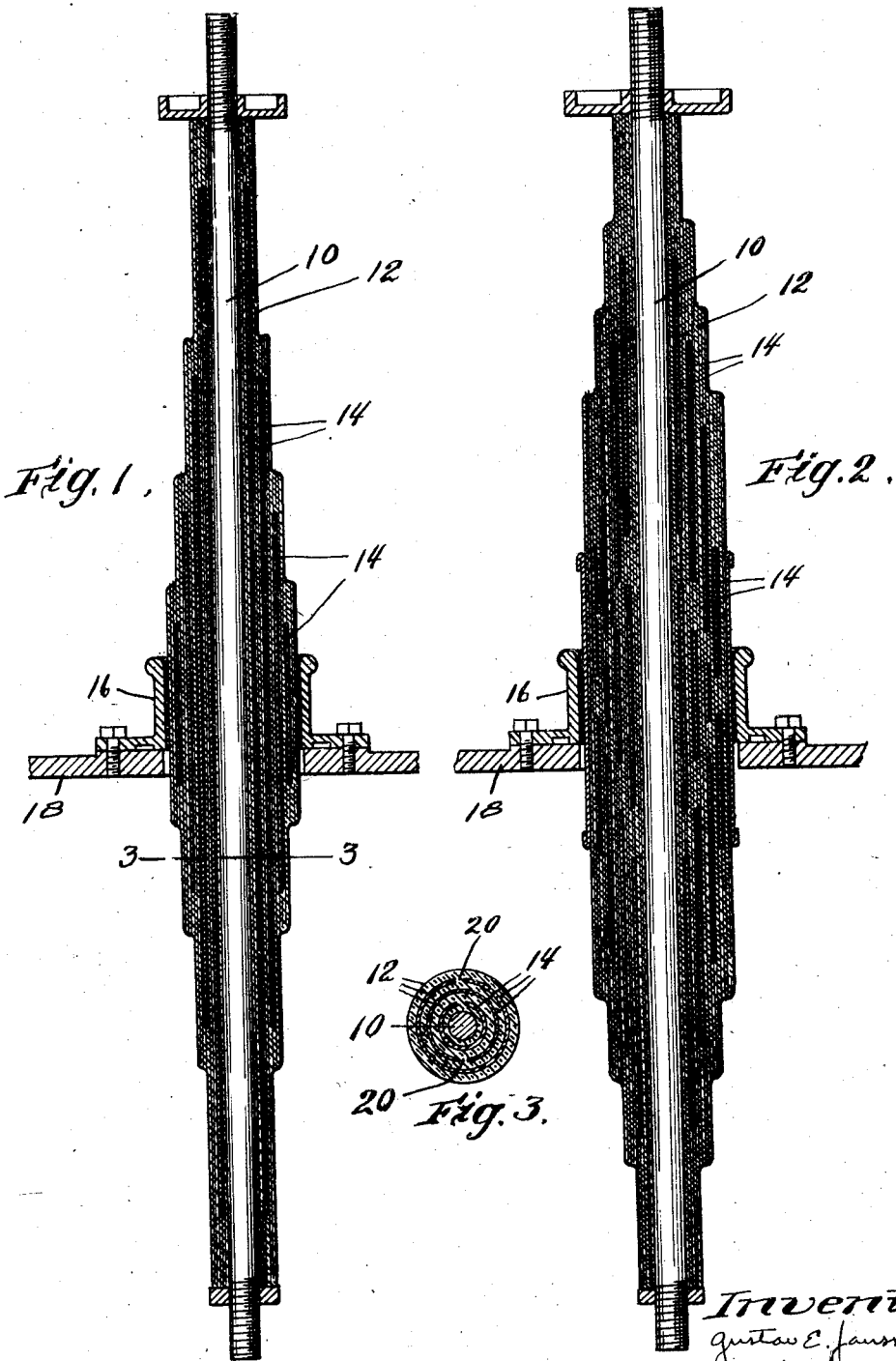

Patented Dec. 1, 1931

1,834,212

UNITED STATES PATENT OFFICE

GUSTAV E. JANSSON, OF WOLLASTON, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

CONDENSER TYPE BUSHING FOR HIGH TENSION ELECTRIC CONDUCTORS

Application filed May 12, 1927. Serial No. 190,863.

This invention relates to insulating bushings for high tension electric circuits leads and especially to condenser type bushings which comprise alternate layers of conducting and insulating materials.

All dielectrics have heat generated therein when subjected to an alternating current electric stress and the heating is more pronounced, the greater the stress. I have found that condenser type bushings have broken down when subjected to long continued high potentials due to the accumulation of heat in the interior of the bushing, resulting from losses in the dielectric, even though the bushings were well able to withstand high potentials applied for but short periods of time.

It is an object of this invention to provide a condenser type bushing which will not be subjected to the accumulation of heat in the interior thereof and, consequently, will be able to withstand long continued high potentials.

In carrying out this invention, I so arrange the bushing that the heating of the dielectric is greatest near the surface of the bushing where the heat can be readily dissipated into the atmosphere, and is least in the interior of the bushing where the heat can not be so readily dissipated. As thus arranged, while the total tendency of the bushing to heat may not be lowered greatly, the main source of heat is so located that the heat is rapidly dissipated and, as a consequence, the temperature of the bushing remains low.

In further carrying out this object of the invention, I so arrange the bushing that the area of the dielectric between the outermost condenser plates is least, and the area of the dielectric between the innermost plates is greatest, and the area of the dielectric between the intermediate condenser plates increases progressively from the outside to the inside of the bushing; and this constitutes a further object of the invention.

As thus arranged, the electric stress on the dielectric near the outside of the bushing is the greatest, and, consequently, has the most heat generated therein. However, since the source of the heat is near the surface of the bushing, the heat can be dissipated readily. But a small amount of heat is generated in the innermost layer of the dielectric, where heat can not be so readily dissipated. As a consequence of this arrangement, the bushing tends to run materially cooler than the usual type of condenser bushing where the areas of the dielectric between the condenser plate are equal and where as much heat is generated in the innermost layers as in the outermost layers.

It is a further object of the invention to make the condenser plates thick and of good conducting metal and to extend the condenser plates about to the surface of the bushing where the outer ends of the plates will be covered only by a thin layer of insulation so that they can conduct heat from the interior of the bushing along the lengths thereof and dissipate the heat from the surface of the bushing. The condenser plates of the usual condenser type bushing are composed of very thin metal, as foil or even a conducting paint, and so can not conduct such material amounts of heat away from the interior of the bushing and dissipate the heat from the surface as will have any material effect in keeping down the internal temperature of the bushing.

With a condenser bushing embracing the above enumerated objects of the invention, the electric tension between the outermost condenser plates is greater than between the innermost plates and it is an object of this invention to prevent flash overs between the edges of the outermost plates along the surfaces of the bushing by increasing the surface length of the bushing between the plates over what would be considered ordinary design, by providing the bushing with a plurality of sets of conductor plates lying between the ground sleeve and the stud and which only partially overlie each other and decreasing the amount of overlapping of the plates in the outer portion of the bushing so that the distance between the plates along the surface of the bushing is materially increased and resistance to flash over is correspondingly increased.

A further object is generally to improve the construction of condenser type bushings.

Fig. 1 is a sectional elevation of a condenser type bushing embodying the invention.

Fig. 2 is a view similar to Fig. 1 but showing a modified arrangement of the condenser-plates.

Fig. 3 is a section along line 3—3 of Fig. 1.

The condenser type bushing embodying the invention, as shown in Fig. 1 includes the high tension conducting stud 10 closely surrounded with alternate and equally spaced layers of insulation 12 and conducting cylinders or condenser plates 14. A flanged sleeve 16 closely surrounds and is attached to the outermost layer of insulation and provides supporting means by which the bushing can be attached to the casing 18 of an electrical apparatus. The sleeve 16 also constitutes the outermost condenser plate of the bushing. Whereas it has previously been the practice to make the condenser plates all of equal area, thus to provide equal unit stresses on the insulation, along the radius of the bushing, in accordance with this invention, I make the condenser plates of unequal area and so arrange them that the area of the sleeve 16 is least and the area of the innermost cylinder 14 is greatest, thus to have the least condenser capacity outermost and the greatest capacity innermost or at the stud. As thus arranged, the potential gradient through that insulating layer between the sleeve and the outermost cylinder 14 is greatest, and is least in the dielectric between the stud and the innermost cylinder and varies propressively at intermediate insulating layers. The outermost layer of insulation has the greatest dielectric losses therein, by reason of its being under highest stress, and is located at the surface of the bushing where the heat is readily dissipated from the surface so that the temperature is kept down and the insulating ability maintained. Heat can not be so readily dissipated from the innermost insulating layer but this layer is subjected to the lowest stress so that little heat is generated therein. The intermediate layers are subjected to increased stresses and heating, depending upon their nearness to the surface, but are better able to throw off the heat. As a consequence of the arrangement, the temperature rise of the insulation is kept down throughout and the ability of the bushing to withstand long applied high potentials is materially enhanced.

Preferably the insulating layers 12 are formed of fibrous material as impregnated paper; and the invention is particularly important with such insulation. While the insulation value of the usual insulating materials used in condenser type bushings decreases with increasing temperature, some materials as porcelain, are not permanently affected by an elevation of temperature. Paper, however, carbonizes at an elevated temperature and thus becomes permanently altered, becoming permanently a conductor even after the potential has dropped to a normal value. With the arrangement above described, however, the temperature of the paper insulation can be kept down so that it will not carbonize rapidly under ordinary conditions.

To provide for the dissipation of heat from the interior of the bushing, the metal cylinders 14 are provided with thick walls, as contrasted with the metal foil commonly employed in bushings of this character, so that heat can flow rapidly from the interior of the bushing along the cylinders to the ends thereof, which are covered only by a single layer of insulation, and then is dissipated from the surface of the bushing.

Said cylinders preferably are longitudinally split as indicated at 20, Fig. 3, so that they can be compressed snugly upon the insulating layers in the process of constructing the bushing and also to avoid a closed metallic circuit through which eddy currents can circulate. The arrangement is otherwise the same as above described.

I claim:

1. A condenser type bushing having a heat dissipating surface, and means which puts the insulating material composing it under greatest electric stress adjacent the surface and under least electric stress at the middle of the bushing.

2. A condenser type bushing having a heat dissipating surface and means which subjects its insulating material adjacent said surface to relatively high electric stress and its insulating material most remote from said surface under relatively low electric stress.

3. A condenser type bushing having a heat dissipating outer surface and a middle conducting stud, and means which subjects its insulating material adjacent said surface to relatively high electric stress and its insulating material adjacent said stud under relatively low electric stress.

4. A condenser type bushing having alternate layers of insulating material and conducting condenser plates, the bushing having a minimum capacity between adjacent condenser plates near the outer surface of the bushing and a maximum capacity between adjacent condenser plates at the middle of the bushing.

5. A condenser type bushing having alternate layers of insulating material and conducting condenser plates, the capacity between adjacent condenser plates of which bushing decreases progressively from the middle to the outer surface of the bushing.

6. A condenser type bushing having alternate layers of dielectric material and conducting condenser plates, the area of the dielectric between the adjacent condenser plates decreasing progressively from the middle to the surface of the bushing.

7. A condenser type bushing having alternate layers of insulating and conducting material of different lengths therein with the inner conducting layer extended beyond the outer conducting layer and disposed close to the surface of the bushing, said conducting layers being of substantial thickness and heat conductivity and thereby characterized by conducting such amounts of heat from the interior of the bushing and dissipating the heat from the surface thereof that the temperature of the interior of the bushing is kept down.

8. A condenser type bushing having a plurality of spaced concentric heat radiators extended from the surface of the bushing into the interior and separated by the insulation of the bushing, said radiators also comprising condenser plates for the bushing and consisting of metal plates which are thick and have good heat conductivity so that an appreciable amount of heat can flow along their lengths from the interior of the bushing and be dissipated from the surface thereof, whereby to keep down the temperature of the insulation in the interior of the bushing.

9. A condenser type bushing having a middle conducting stud and an outer ground sleeve and two sets of serially-arranged condensers located lengthwise of the bushing between the stud and sleeve, the sets being in parallel relation between the stud and sleeve, and the ground sleeve and stud constituting condenser units which are common to both sets of condensers.

10. A condenser type bushing having a middle conducting stud and an outer ground sleeve and two sets of serially-arranged condensers located lengthwise of the bushing between the stud and sleeve, the sets being in parallel relation between the stud and sleeve and the capacity of the condensers of each set decreasing progressively from the stud to the sleeve, the ground sleeve and stud constituting condenser elements which are common to both sets of condensers.

11. A condenser type bushing having a central conductor, a plurality of concentric metal tubes and interposed dielectrics surrounding and carried by one another and said central conductor, said tubes comprising condenser plates and characterized by each having a slot extended from end to end of it, and a supporting member surrounding the aforesaid parts intermediate their ends and constituting a support for the bushing.

12. An insulating bushing comprising the combination of a middle conductor, a series of concentric metal cylinders of graded areas surrounding said conductor, those cylinders having greater areas being disposed within those of smaller areas, and a body of insulating material occupying the space between said cylinders and between the innermost cylinder and conductor and enclosing the ends of said cylinders.

13. An insulating bushing comprising dielectric material, and temperature controlling means comprising a plurality of conducting layers of metal having unequal surface areas so disposed throughout said material that the confronting areas of the layers are least and consequently the dielectric losses within the material are greatest in those regions of the material nearest the surface of the bushing and thus best situated to radiate heat.

In testimony whereof, I have signed my name to this specification.

GUSTAV E. JANSSON.